(12) United States Patent
Eberle et al.

(10) Patent No.: US 7,430,236 B2
(45) Date of Patent: Sep. 30, 2008

(54) COMMUNICATION INTERFACE FOR A PATH MEASURING DEVICE

(75) Inventors: Hans-Juergen Eberle, Unterensingen (DE); Thomas Burkhardt, Zell u.A. (DE); Bernd Buehlmeyer, Neuhausen (DE)

(73) Assignee: Balluff GmbH, Neuhausen (DE)

( * ) Notice: Subject to any disclaimer, the term of this patent is extended or adjusted under 35 U.S.C. 154(b) by 607 days.

(21) Appl. No.: 10/099,127

(22) Filed: Mar. 15, 2002

(65) Prior Publication Data
US 2002/0131485 A1    Sep. 19, 2002

(30) Foreign Application Priority Data
Mar. 19, 2001    (DE) ................. 101 13 716

(51) Int. Cl.
*G01S 3/80*    (2006.01)
*H04B 3/46*    (2006.01)
(52) U.S. Cl. ................. 375/224; 367/118
(58) Field of Classification Search ................. 375/224, 375/219, 220; 367/20, 22, 118, 129, 140, 367/168
See application file for complete search history.

(56) References Cited
U.S. PATENT DOCUMENTS 4,688,947 A  *  8/1987  Blaes et al. ................. 368/120
4,740,992 A  *  4/1988  Havens et al. ................. 375/219
5,180,937 A  *  1/1993  Laird et al. ................. 327/276
5,212,444 A      5/1993  Abramovich et al.
5,247,296 A  *  9/1993  Spies ................. 340/903
6,058,775 A      5/2000  Levy
6,405,047 B1 *  6/2002  Moon ................. 455/456.1

FOREIGN PATENT DOCUMENTS

| DE | 31 31 455 | 3/1983 |
| DE | 36 15 463 | 11/1987 |
| EP | 0 101 528 | 11/1989 |
| EP | 0 219 120 | 1/1993 |

\* cited by examiner

*Primary Examiner*—Kevin M Burd
(74) *Attorney, Agent, or Firm*—Lipsitz & McAllister, LLC

(57) ABSTRACT

A communication interface for a path measuring device is provided. The interface can be coupled between the path measuring device and a control device. A path determination can be carried out by the path measuring device by way of a measurement of the propagation time of measurement signals. A measurement of the propagation time can be triggered by way of control signals on a control signal communication channel. A propagation-time signal communication channel is provided for propagation-time signals. The present invention enables a path measuring device to be used universally and in a simple manner, as the communication interface may be coupled to the control signal communication channel and/or to the propagation-time signal communication channel and digital data may be transmittable between the control device and the path measuring device in addition to control signals for the measurement of the propagation time and propagation-time signals.

51 Claims, 3 Drawing Sheets

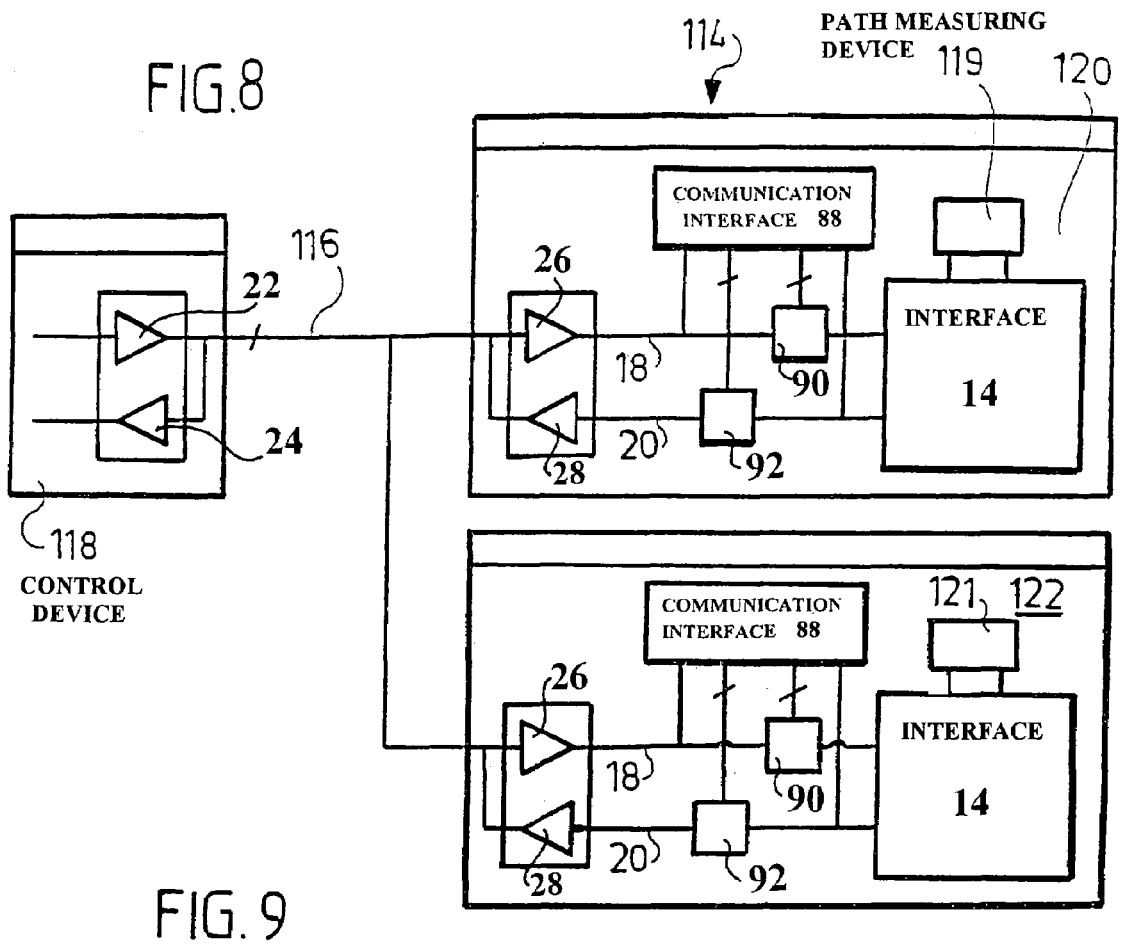
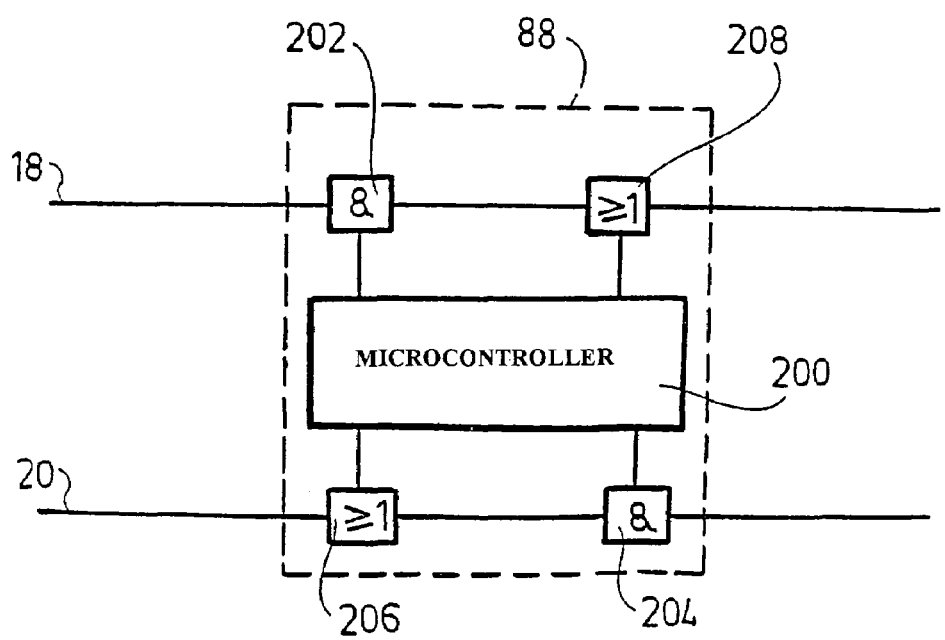

COMMUNICATION INTERFACE FOR A PATH MEASURING DEVICE

The present disclosure relates to the subject matter disclosed in German application No. 101 13 716.8 of Mar. 19, 2001, which is incorporated herein by reference in its entirety and for all purposes.

BACKGROUND OF THE INVENTION

The invention relates to a communication interface for a path measuring device which can be coupled between the path measuring device and a control device for the path measuring device, wherein a path determination can be carried out by a measurement of the propagation time of measurement signals and a measurement of the propagation time can be triggered by control signals on a control signal communication channel and a propagation-time signal communication channel is provided for propagation-time signals.

One example of such a path measuring device is a magnetostrictive path transducer, with which an acoustic wave is generated via an electric excitation current pulse and the propagation time of this wave in a waveguide is determined, wherein a signal converter is arranged at a certain point of the waveguide and this generates a reaction pulse at a time interval in relation to the exciting current pulse.

The measurement signals, the propagation time of which is determined, are triggered by signals of an electronic circuit which is connected to the measuring device and the reaction signals are accordingly converted again into signals of the electronic circuit so that a measurement of the propagation time can be carried out between the signals of the electronic circuit. In order, on the other hand, to trigger a starting signal for the measurement of the propagation time, a control signal is provided as triggering signal which is transmitted on a propagation-time signal communication channel.

The object underlying the invention is to provide a communication interface, by means of which a path measuring device may be used universally and in a simple manner.

SUMMARY OF THE INVENTION

This object is accomplished in accordance with the invention, in the communication interface specified at the outset, in that the communication interface is coupled to the control signal communication channel and/or to the propagation-time signal communication channel and that digital data can be transmitted between the control device and the path measuring device in addition to control signals for the measurement of the propagation time and propagation-time signals.

In practice, the problem arises, for example, that a path measuring device with a magnetostrictive transducer must be exchanged. A waveguide of the new path measuring transducer may, in this respect, have a propagation speed for the acoustic waves which is possibly only slightly different; however, since the path determination is based on a measurement of the propagation time, the exact knowledge of the speed is necessary. Up to now, a reprogramming in the control device was necessary in such cases with the corresponding time required. As for the rest, there was also the risk of measurement errors occurring when the new speed was not programmed in. Since path measuring devices are also used in safety-relevant fields, such as in machine tools, this represents a very relevant problem.

In accordance with the invention, it is now provided for additional data to also be transmittable between the control device and the path measuring device in addition to the data directly connected to a measurement of the propagation time (control signals and propagation-time signals). These additional, digital data may then be added to the control signals and/or propagation-time signals (without interfering with these control signals and/or propagation-time signals) in order to be able to convey information from the control device to the path measuring device and/or vice versa. For example, a control device can then read the corresponding parameters from the path measuring device (in particular, via a corresponding measurement interface, in which the fixed ultrasonic speed of a path measuring device is stored) and adjust them accordingly without an operator having to undertake programming activities each time for this purpose; as a result, it may be ensured automatically that the control device which is connected to the path measuring device correctly interprets the measurement signals.

As a result of the inventive communication interface, optional parameters or instructions may be transmitted to the path measuring device, such as, for example, serial numbers, producer designations, production data, version numbers for hardware and software, ultrasonic speeds, minimum positions for the path determination, maximum positions, number of position indicators allowed, cam positions, types of operation, bus node addresses and the like. A plurality of data may likewise be requested from a path measuring device by the control device, such as, for example, ultrasonic speed, producer identification, status information and error status, voltage level, temperature, status of the position indicators etc.

The coupling between control device and particular measuring device may therefore be optimized due to the possibility of the transmission of data in order to ensure that the control device correctly interprets the measurement results of the measuring device, i.e., in particular, determines the correct path from the determination of the propagation time.

In this respect, it is favorable when the transmission of data is shifted in time in relation to control signals and/or propagation-time signals so that the transmission of data may be added to the "normal" operation of the path measuring device in conjunction with the control device without interfering with it.

It is customary for the propagation-time signals to comprise starting signals for triggering a measurement of the propagation time and stop signals, wherein the propagation time results from the time interval between starting signal and associated stop signal. The starting signals trigger, on the other hand, measurement signals in the path measuring device, such as, for example, an exciting current pulse with a circular magnetic field which leads to the formation of an acoustic wave at the position of a magnet. A reaction signal thereto triggers a stop signal. The control device can then determine the propagation time, for example, of the acoustic wave in a waveguide via the interval between starting signal and stop signal.

In a variation of one embodiment, it is provided for a control signal to trigger a starting signal for triggering the measurement of the propagation time. This control signal, which is supplied by the control device, brings about the starting signal which, on the other hand, initiates the measurement of the propagation time.

Particularly when the control device has to determine relevant system parameters of the path measuring device, such as ultrasonic speed, it is advantageous when the transmission of stop signals is blocked during the transmission of data. In this case, no measurement of the propagation time takes place during and even for a certain period of time following the transmission of data since the control device has to first adjust accordingly in order to be able to carry out the relevant path determination from the determination of the propagation time.

The addition of data may be carried out without great resources when digital data can be transmitted serially and, in particular, bit-serially between the control device and the path measuring device, i.e., can be transmitted in packets. In the case of a serial transmission of data, in particular, no additional communication channels need be provided.

In this respect, it may be provided for an information unit for the transmission of data between control unit and path measuring device to comprise n bits. In order to recognize an information unit as such, a starting bit is advantageously provided, with which the information unit begins. Such starting bits are also designated as start-of-frame bits.

It is particularly advantageous when instructions and/or parameters can be transmitted to the path measuring device in order, for example, to cause this to transfer into certain modes of operation or to send back to the control device information requested. The transmission of instructions and/or parameters to the path measuring device is favorably brought about on the control signal communication channel since essentially only the control signal, the periodicity of which is determined exactly, is present on this channel. In addition, the control signal communication channel may be designed in an inexpensive manner such that it is unidirectional, i.e. that only data to the path measuring device can be sent via it.

Furthermore, it is advantageous when response data of the path measuring device to instructions and/or parameters received can be transmitted to the control device, i.e. when the path measuring device can react to requests of the control device which do not relate directly to measurement of the propagation times. Favorably, the transmission of response data takes place on the propagation-time signal communication channel. This communication channel may then likewise be designed unidirectionally since a starting signal can be generated directly following a control signal and a stop signal must, in any case, be transmitted to the control device.

It is likewise favorable when event data and/or parameter data of the path measuring device can be transmitted to the control device, such as, for example, ultrasonic speed of a waveguide, status of the position indicators and so on. It is advantageous for the reasons already specified above when the transmission of the event data and/or parameter data takes place on the propagation-time signal communication channel.

In this respect, it may be provided for the path measuring device to send event data and/or parameters cyclically to the control device. As a result, certain data, such as cam positions as switching points, can be transmitted to the control device periodically without interfering with the actual measurement of the propagation time. The control device can then determine the status of the path measuring device at regular intervals.

In a variation of one embodiment it is provided for a pulse duration of a control pulse, which triggers a measurement of the propagation time, to be adjustable. As a result, it is possible to send instructions to the path measuring device or rather trigger a transmission of instructions. It is customary for a starting flank of a control pulse to trigger a measurement of the propagation time. As a result, it is possible for a pulse duration of the control pulse, which triggers a measurement of the propagation time, to have an instruction effect for the path measuring device. An instruction and/or a parameter are transmitted to the path measuring device, in particular, when a certain pulse duration threshold is exceeded. As a result of the adjustment of the pulse duration threshold, for example, via the control device, an additional degree of freedom is created with respect to the communication between control device and measuring device without additional communication channels needing to be provided. This additional degree of freedom may, therefore, be achieved in a simple manner.

In an additional variation of one embodiment it is provided for the transmission of instructions and/or the transmission of parameters to take place at a certain time interval in relation to the control pulse. As a result, the communication interface can then supply the measuring device in a selective manner with corresponding instructions and/or parameters.

It is favorable when the communication interface is coupled to the respective communication channels via multiplexers in order to be able to carry out a transmission of data added to the normal protocol.

One example of a path measuring device, with which a path determination is based on a measurement of the propagation time, comprises a path transducer, in or on which mechanical waves propagate. The corresponding time information may be gained from the propagation of these waves. A known example is a path transducer acting magnetostrictively, with which a permanent magnet as transmitter triggers an acoustic wave, the propagation time of which on a waveguide can be determined.

Another example of a path measuring device with determination of the propagation time comprises a path transducer, in or on which electromagnetic waves propagate. A path can again be determined from the propagation time of these electromagnetic waves. In particular, the propagation time of a light signal between an optical transmitter and an optical receiver may be determined by means of the path transducer. If an optical object is arranged in a corresponding light beam, the distance between the reflecting object and the transmitter/receiver can be determined via the measurement of the propagation time and, therefore, the associated path.

The invention relates, in addition, to a path measuring system, comprising one or more path measuring devices which can be coupled to a control device and with which a path determination can be carried out via a measurement of the propagation time of measurement signals, a control signal communication channel, via which a measurement of the propagation time can be triggered, and a propagation-time signal communication channel for propagation-time signals.

The object specified at the outset is accomplished in accordance with the invention in such a path measuring system in that an inventive communication interface is provided.

The advantages of such a path measuring system as well as advantageous developments thereof have already been discussed in conjunction with the inventive communication interface.

It may, in particular, be provided for a plurality of path measuring devices to be present. In the case of a machine tool, movements of a tool head in various axis directions may, for example, be monitored with a control device.

It is particularly advantageous when the path measuring system is connected to the path measuring devices via a data bus. Each individual one of the path measuring devices may then be addressed in a selective manner via the data bus in order to obtain corresponding propagation-time information. The additional data may also be transmitted between the control device and the particular, selected measuring device. Favorably, a specific path measuring device can be addressed for this purpose by the control device via an address identification.

A communication channel may be unidirectional, i.e. allow signals to pass only in one direction, or bidirectional.

The invention relates, in addition, to a method for the control of a path measuring device comprising a path determination by means of a measurement of the propagation time of measurement signals, with which control signals for triggering the measurement of the propagation time are transmitted via a control signal communication channel and propagation-time signals are transmitted on a propagation-time signal communication channel.

The object underlying this method is the same as that for the path measuring system specified above.

This object is accomplished in accordance with the invention in that digital data are transmitted in addition to the control signals and propagation-time signals via a communication interface which is coupled to the control signal communication channel and/or the propagation-time signal communication channel.

This method has the advantages already explained in conjunction with the inventive communication interface and the inventive path measuring system.

Additional advantageous developments have already been explained in conjunction with the inventive communication interface and the inventive path measuring system.

The following description of preferred embodiments serves to explain the invention in greater detail in conjunction with the drawings.

BRIEF DESCRIPTION OF THE DRAWINGS

FIG. 8 shows one embodiment of a path measuring system which comprises a plurality of path measuring devices which are connected to a control device, and FIG. 9 shows a schematic illustration of the set-up of a communication interface in accordance with the invention.

DETAILED DESCRIPTION OF THE INVENTION

Figure 1:
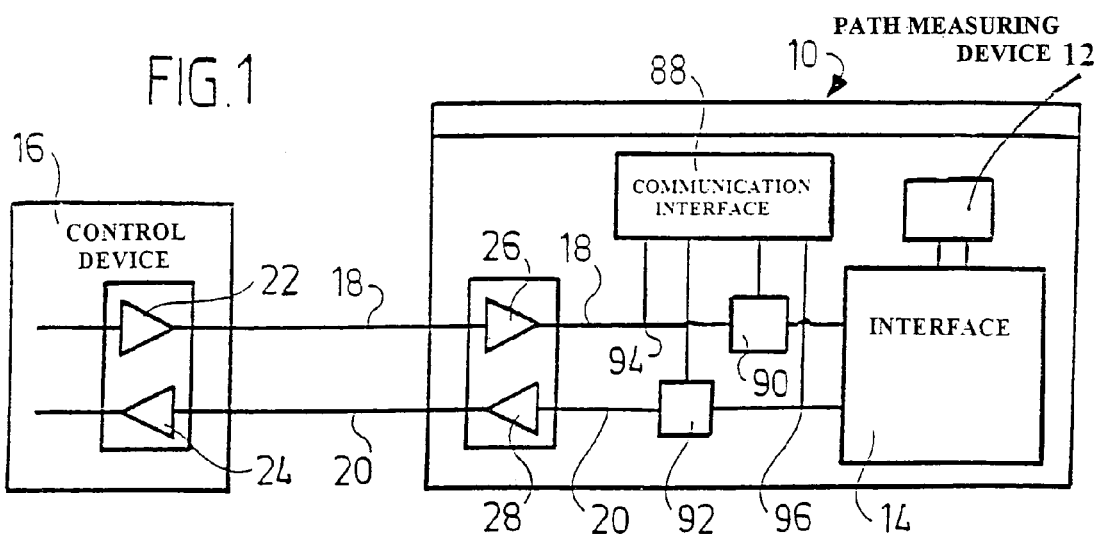
FIG. 1 shows a schematic illustration of one embodiment of a path measuring system with a communication interface in accordance with the invention.

A first embodiment of a path measuring system in accordance with the invention which is illustrated schematically in FIG. 1 and designated as a whole as 10 comprises a path measuring device 12. Examples of such path measuring devices are explained in the following on the basis of FIGS. 2 and 3.

A measurement interface 14 is associated with the path measuring device 12 and this can also be part of the path measuring device 12, via which a measurement can be triggered and via which measurement results can be made available for evaluation.

The triggering of measurements and the actual processing of a measurement takes place via a control device 16 which is connected to the measurement interface 14 via an, in particular, unidirectional control signal communication channel 18 and an, in particular, unidirectional propagation-time signal communication channel 20. For this purpose, the control device 16 comprises a transmitter 22, via which control signals can be transmitted via the control signal communication channel 18 to the path measuring system 10. Furthermore, a receiver 24 is provided, by means of which propagation-time signals can be received from the path measuring system 10 via the propagation-time signal communication channel.

The two channels 18 and 20 may be located on one line or on separate lines.

In the variation of one embodiment shown in FIG. 1 the path measuring system 10 comprises a control signal receiver 26 which is coupled to the control signal communication channel 18 and conveys control signals on this communication channel 18 to the measurement interface 14. Furthermore, a propagation-time signal transmitter 28 is provided which is coupled to the propagation-time signal communication channel 20 and conveys propagation-time signals from the measurement interface 14 to the control device 16.

Figure 2:
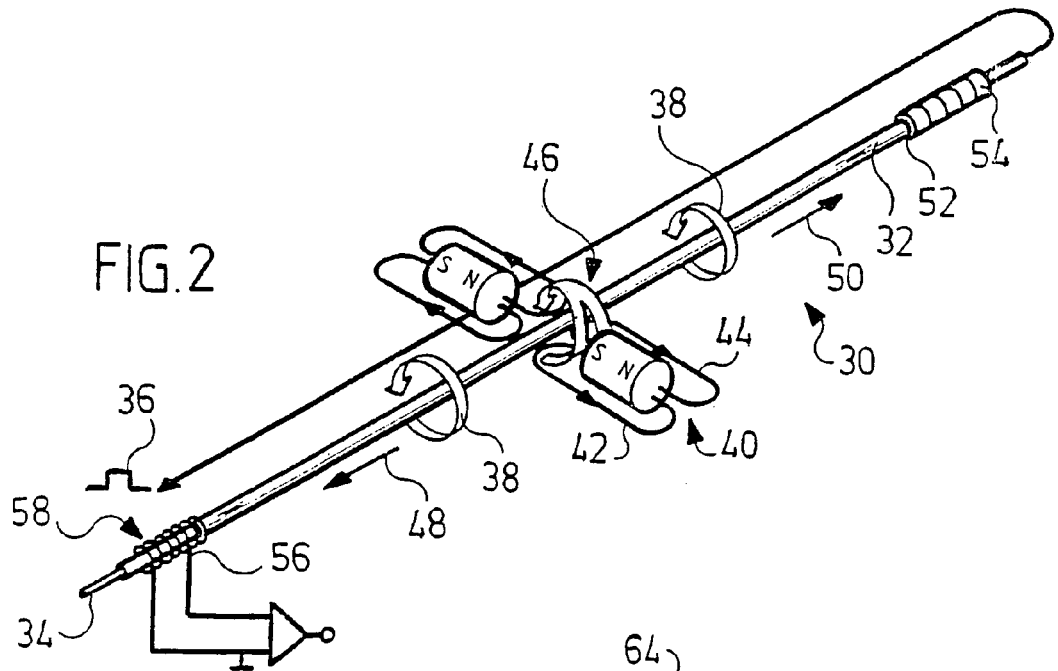
FIG. 2 shows a schematic illustration of a magnetostrictive path transducer as an example of a path measuring device.

In the case of a magnetostrictive path measuring device, designated as a whole as 30 in FIG. 2, as first embodiment of a path measuring device 12, a waveguide 32 is provided which represents the actual measuring element. The waveguide 32 is, for example, of a tubular design or produced in wire form and consists, for example, of a nickel-iron alloy. A copper conductor 34 is threaded into it.

An excitation current pulse 36 as measurement signal, originating from the measurement interface 14, triggers a measurement. The excitation current pulse 36 is, again, triggered, as will be described further on, by means of a starting signal on the propagation-time signal communication channel 20 which is triggered by a control signal on the control signal communication channel 18.

The exciting current pulse 36 generates a circular magnetic field 38 which, on account of magnetically soft properties of the waveguide 32, is bundled in it. A permanent magnet 42 is arranged at a point of measurement 40 of the waveguide 32 as path transducer, wherein its magnetic field lines 44 extend at right angles to the circular magnetic field 38 and are likewise bundled in the waveguide 32.

In an area 46, in which the two magnetic fields 38 and 44 are superimposed, an elastic deformation results in the microarea of the structure of the waveguide 32 on account of magnetostriction. This elastic deformation again causes an elastic wave propagating along the waveguide 32 in opposite directions 48, 50. The propagation speed of this wave in the waveguide 32 is, for example, approximately 2,800 m/s and is for the most part insensitive to environmental influences. On account of production tolerances, statistically varying propagation speeds, for example, in the range between 2,700 m/s and 2,900 m/s can, however, result in a series of waveguides 32.

An attenuator 54 is provided at one end 52 of the waveguide 32, by means of which the transonic wave running towards this end 52 is attenuated away.

A signal transducer 58 is arranged at the other end 56 and this generates an electric signal by reversing the magnetostrictive effect and supplies this to the measurement interface 14.

The propagation time of the wave from the place of origin 40 to the signal transducer 58 is directly proportional to the distance between the permanent magnet 42 as position indicator and the signal transducer 58. The distance between the signal transducer 58 and the permanent magnet 42 can therefore be ascertained with considerable accuracy by means of a time measurement. The primary measurement signal for this time measurement is the exciting current pulse 36 on the waveguide 32 and its reaction pulse which is supplied by the signal transducer 58 to the measurement interface 14 shifted in time as a function of the distance between the signal transducer 58 and the permanent magnet 42.

The reaction pulse, on the other hand, triggers a stop signal as propagation-time signal which is transmitted to the control device 16 via the propagation-time signal communication channel 20. The time interval between the excitation current pulse 36 and its reaction pulse is then imaged in the time interval between the starting signal and the stop signal on the propagation-time signal communication channel 20 and can be determined accordingly by the control device 16.

The path determination in the case of the magnetorestrictive path measuring device 30 is based on the propagation of an ultrasonic wave in a waveguide 32 which is generated via the exciting current pulse 36 at a predetermined point of time and the propagation time of which can be measured via the reaction pulse determined by the signal transducer 58.

Figure 3:
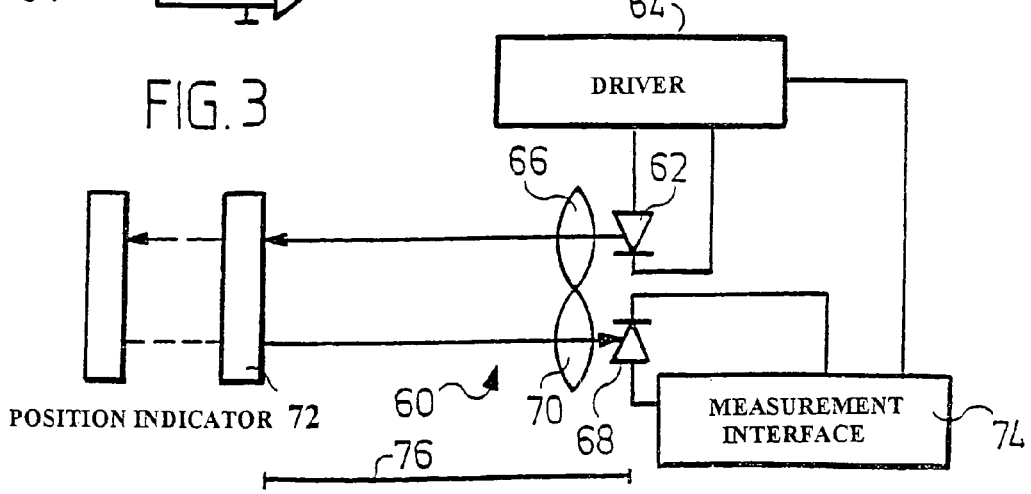
FIG. 3 shows a schematic illustration of an optical path measuring device.

A second embodiment of a path measuring device is shown schematically in FIG. 3; it is designated as a whole as 60 and, in this case, a path determination is based on a measurement of the propagation time of an optical signal.

For this purpose, a laser diode is provided as light transmitter 62 and this is activated via a driver 64. Optical means 66, such as, for example, lens systems are provided for the direction of the light signal.

Furthermore, a receiver 68 with associated optical means is provided, by means of which optical measuring signals, which are transmitted by the transmitter 62 and are reflected at a reflecting position indicator 72, are received. In this respect, a measurement interface 74 is provided which corresponds to the measurement interface 14 and by means of which the transmission of optical signals via the transmitter 62 and the reception of optical signals reflected back via the receiver 68 are initiated and evaluated.

A distance 76 between the path measuring device 60 and the object 72 results from the product of the light velocity and half the signal propagation time of a measurement signal which this requires starting from the transmitter 62 up to its reception by the receiver 68. A path determination may therefore be carried out by measuring this propagation time.

Figure 4:
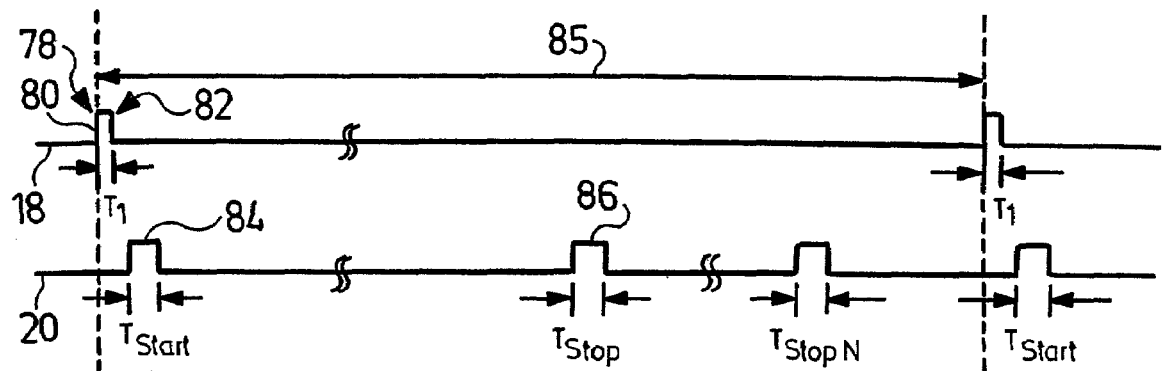
FIG. 4 shows a sequence of pulses known from the state of the art on a control signal communication channel and a propagation-time signal communication channel during a path determination.

In order to carry out a measurement of the propagation time, it is known to pass a control signal 78, as shown in FIG. 4, onto the control signal communication channel 18 via the control device 16. The control signal is, for example, formed by an ascending flank 80 of a control pulse 82 with a pulse length $T_f$. It may be provided for such control pulses 82 to be transmitted at regular time intervals 85 ("init frame") from the control device 16 to the path measuring device 12 in order to carry out a cyclical position interrogation.

The control signal 78, in the example of FIG. 4 the flank 80, triggers a starting signal 84 as a propagation-time starting signal on the propagation-time signal communication channel 20. This starting signal again causes the triggering of a measurement signal in the measurement interface 14, for example, in the case of FIG. 2 the triggering of the exciting current pulse 36 for starting a measurement of the propagation time. The pulse width of a propagation-time starting signal is $T_{start}$.

The reaction signal of the measuring device 12 triggers in the measurement interface 14 a propagation-time stop signal 86 which is, for example, a stop pulse of a width $T_{stop}$. This propagation-time stop signal is transmitted on the propagation-time signal communication channel 20 to the control device 16 which can then determine the propagation time of the measurement signal, for example, on the waveguide 32 from the distance between the propagation-time starting signal 84, which has likewise been transmitted to it, the point of time the control signal 78 was sent, the time interval between the control signal 78 and the propagation-time starting signal 84 and, where applicable, taking into account the pulse widths of the propagation-time signals 84 and 86.

In accordance with the invention, a communication interface 88 is provided, as shown schematically in FIG. 1, and this is coupled, for example, via a multiplexer 90 to the control signal communication channel 18 and via a multiplexer 92 to the propagation-time signal communication channel 20. A respective, additional multiplexer-free coupling 94, 96 to the communication channels 18, 20 may also be provided.

Digital data may be transmitted by means of the communication interface 88 from the control device 16 via the control signal communication channel 18 and/or via the propagation-time signal communication channel 20 between the control device 16 and the path measuring device 12. The transmission takes place separately from control signals and propagation-time signals, i.e. in the case of an integrated data protocol which may be carried out by means of the communication interface 88 transmission data may be added to the control signal communication channel 18 and the propagation-time signal communication channel 20.

In a variation of one embodiment, the communication interface 88 comprises, as shown in FIG. 9, a microcontroller 200 which controls the exchange of data between the control device 16 and the path measuring device 12 between the control signals for the measurement of the propagation time and the propagation-time signals.

For example, the microcontroller 200 is connected to the control signal communication channel 18 via a logical AND operation 202 and, furthermore, via an additional logical AND operation 204 to the propagation-time signal communication channel 20. If data are then present on the control signal communication channel 18, the microcontroller 200 can provide for a corresponding control of the temporal course of the flow of data by means of its AND operations 202 and 204 with these communication channels 18 and 20, as will be described in the following by way of example on the basis of FIGS. 5 and 6. For example, it may be indicated to the microcontroller 200 via a control pulse that data sent via the control signal communication channel 18 are transmission data which are intended to be transmitted to the path measuring device 12 between propagation-time signals on the propagation-time signal communication channel 20. The microcontroller 200 processes these data and has, for example, an intermediate memory for these data. Since it is connected to the propagation-time signal communication channel 20 via the AND operation 204, it can ascertain the correct point of time for sending the data to this communication channel 20.

In order to send data to the propagation-time signal communication channel 20 and thus to transmit the data on it, the microcontroller 200 is connected to this propagation-time signal communication channel 20 via a logical OR operation 206. The microcontroller 200 can thus switch the transmission data over to the propagation-time signal communication channel 20 in a time controlled manner.

In a variation of one embodiment, the microcontroller 200 is connected to the control signal communication channel 18, in addition, via a logical OR operation 208. As a result, it is possible to trigger control signals internally by means of the microcontroller 200 in addition to control signals triggered externally via the control device 16 and then transmit them on the control signal communication channel 18 to the path measuring device 12. The AND operation 202 together with the OR operation 208 facilitates a superimposition or switchover between external control signals and control signals generated internally. Control signals generated internally are thereby generated by the path measuring system 10 without any participation of the control device 16.

The operating principle described may also be used when more than two communication channels are present.

Figure 7:
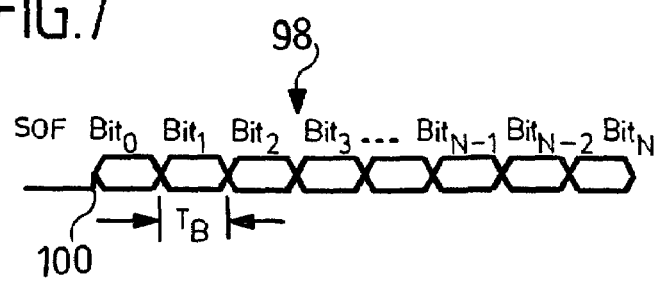
FIG. 7 shows a schematic illustration of an information unit which can be transmitted between a control device and a path measuring device via the inventive communication interface.

These transmission data are digital data which are transferred, in particular, bit-serially. In FIG. 7, an information unit 98 of such a data transmission is illustrated by way of example, wherein this information unit 98 comprises N bits and a pulse length $T_B$ is associated with one bit. The beginning of such an information unit 98 is indicated by a starting bit 100 (start-of-frame bit—SOF bit).

The pulse length $T_B$ can be set, for example, at approximately 4is. As a result, a transmission of data is ensured even in the case of simple driver modules. In the case of an information unit consisting of 11 bits (starting bit, 8 data bits, parity bit, stop bit) a data transmission rate of 250 kbits/s then results.

As a result of the communication interface 88, instructions and/or parameters may, for example, be transmitted by the control device 16 to the path measuring device 12 between the control signals and propagation-time signals. For example, serial numbers, producer designations, production data, version numbers for hardware and/or software, ultrasonic speeds, minimum positions during the path determination, maximum positions, number of position indicators allowed, cam position, operating modes, such as measuring mode or transmission mode, or bus node addresses may be transmitted.

Figure 5:
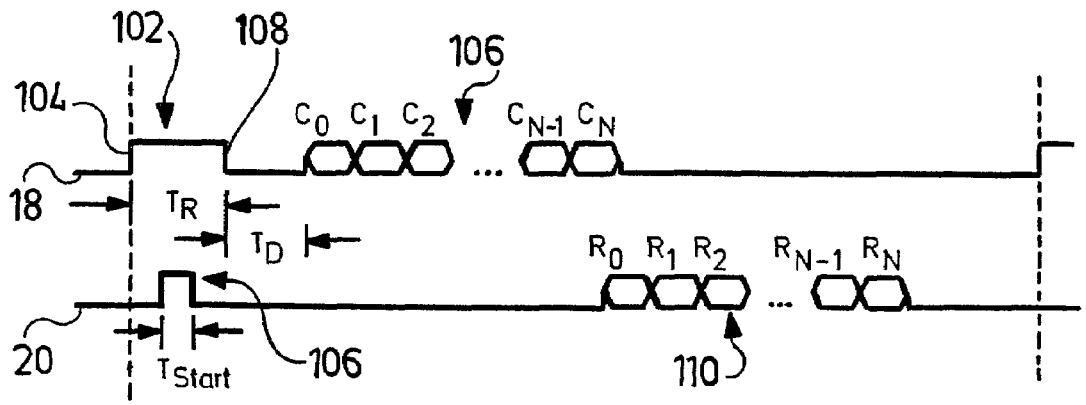
FIG. 5 shows one embodiment of a sequence of pulses in accordance with the invention on a control signal communication channel and propagation-time signal communication channel.

As shown by way of example in FIG. 5, a control pulse 102 can be specified via the control unit 16 and its pulse length $T_R$ can be adjusted. An ascending flank 104 of this control pulse 102 represents the control signal which causes the triggering of a starting signal 106 on the propagation-time signal communication channel 20.

A transmission of instructions or transmission of parameters of an information unit 106 comprising N bits can now take place on the control signal communication channel 18 depending on the adjustable pulse duration $T_R$. If, for example, the set pulse duration is less than a certain threshold value, this means that no transmission of data is intended to take place outside of the control signals and the propagation-time signals; if this threshold value is, however, exceeded, the information unit 106 is, for example, sent from the control unit 16 to the path measuring device 12 shifted in time by the duration $T_D$ in relation to the descending flank 108 of the control pulse 102.

It may be provided for response data 110 to be transferred from the path measuring device 12 to the control unit 16 prior to, following or between stop signals. These response data to the instructions and/or parameters contained in the information unit 106 may be, for example, ultrasonic speed in the waveguide 32, serial numbers, producer identifications, status information and error status, voltage levels, temperature, status of the position indicators etc. of the path measuring device 12.

In FIG. 5, an example is shown, with which the response data 110 are not transmitted between propagation-time signals but rather, on account of a corresponding instruction of the control device 16 which has been transmitted via the control signal communication channel 18, a propagation-time stop signal in accordance with a stop signal 86 in FIG. 4 is not transmitted but rather solely the response data 110 without any stop signal. Therefore, the measurement of the propagation time in the embodiment according to FIG. 5 is, to a certain extent, interrupted.

Figure 6:
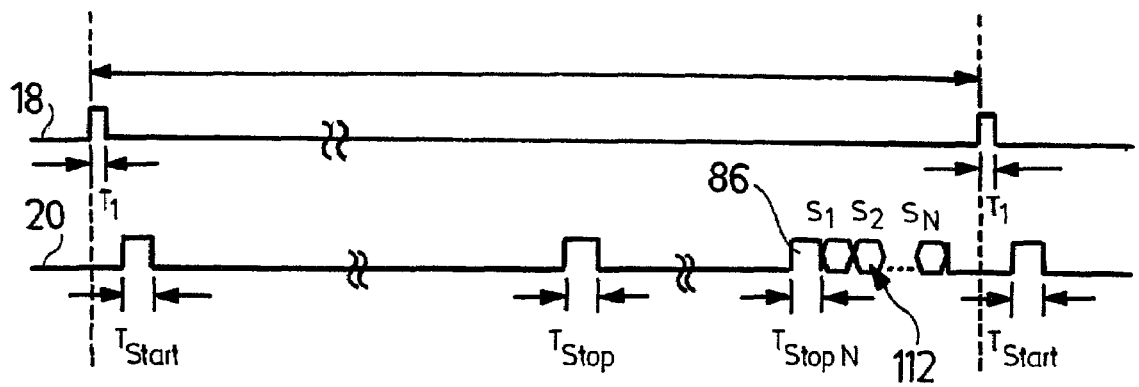
FIG. 6 shows an additional embodiment of a sequence of pulses in accordance with the invention.

In a further embodiment, which is shown in FIG. 6, a set of data 112 is transmitted subsequent to a propagation-time stop signal 86 on the propagation-time signal communication channel 20 from the path measuring device 12 to the control device 16 without an explicit instruction being given each time by the control device for this purpose. On the contrary, it has been set so that the set of data 112 is transmitted cyclically, i.e. a set of data 112 is transmitted to the control device 16 regularly at the same time intervals following a propagation-time starting signal cycle. As a result, the switching state of cams, the speed of the wave propagation on the waveguide 32, the status of the position indicators etc. can, for example, be transmitted to the control device 16.

One example for the use of the transmission of digital data is, for example, when a magnetostrictive measuring device has to be exchanged and the new path measuring device has a different ultrasonic speed. The ultrasonic speed inherent in a magnetostrictive path measuring device 30 may be stored, for example, in the measurement interface 14.

If a new path measuring device 30 is used in conjunction with the control device 16, the software in it would need to be modified accordingly in order to take into account the altered ultrasonic speed. In accordance with the invention, it is now possible for the control device 16 to interrogate the path measuring device with respect to the ultrasonic speed, for example, within the scope of the embodiment shown in FIG. 5, to then receive the corresponding information and thus be able to adapt automatically with respect to the new speed without an operator needing to take further measures. If the new ultrasonic speed is stored in the control device 16, normal measurement procedures can be carried out for the path determination. The triggering of the corresponding instruction for the interrogation of the ultrasonic speed can be triggered by means of the adjustment of the pulse duration $T_R$ of the control pulse 102, for example, when this pulse duration exceeds the duration $T_I$ of a "normal" control pulse 82 (cf. FIG. 4), for example, by 50%.

In one variation of use, a path measuring device 12 is utilized as a cam switching mechanism, with which certain positions are permanently set as switching points (cams). Each switching point is coded with a piece of data, for example, a number. When a position indicator is located in front of a certain switching point, the associated piece of data is transmitted to the control device 16, following the switching point the subsequent piece of data. The piece of data is defined, for example, as a number coded in ASCII. As a result, nine switching points may be represented. This piece of data is transmitted on the propagation-time signal communication channel 20, for example, in accordance with FIG. 6 in an asynchronous, serial, periodic manner.

In one embodiment of a path measuring system, which is designated in FIG. 8 as a whole as 114, this path measuring system 114 can be coupled to a control device 118 via a data bus 116.

The path measuring system 114 comprises a plurality of path measuring devices 119, 121 and associated subunits of the path measuring system which are designated in FIG. 8 as 120 and 122 and are, in principle, of the same construction as the path measuring system which has been described on the basis of FIG. 1.

The measuring devices 119, 121 associated with the subunits 120, 122 may be controlled, in particular, via the control device 118 such that the corresponding propagation-time information can be obtained, wherein this is brought about in the same way as that described above and a transmission of data between the control device 118 and the respective measuring devices may likewise be carried out in addition to the transmission of control signals on control signal communication channels 18 and propagation-time signal communication channels.

A specific path measuring device from the plurality of path measuring devices 119, 121 may be activated by the control device 118 by means of the data bus 116 and the corresponding starting signals and stop signals of the propagation-time signals transmitted to the control device 118.

The control device 118 does not send any control signal via the data bus 116 but rather an address identification to the selected path measuring device, wherein a control signal is then triggered in the associated subunit, as described above. The control device 118 thereby sends an asynchronous serial address byte. If a certain path measuring device has been addressed accordingly, it starts its "conventional" measurement as described above.

The invention claimed is:

1. Communication interface for a path measuring device, a distance measurement being carried out by means of the path measuring device by way of a measurement of the propagation time of measurement signals, the measurement of the propagation time being triggered by way of control signals from a control device to the path measuring device on a control signal communication channel, a propagation-time signal communication channel being provided for propagation-time signals from the path measuring device to the control device, said interface comprising:
a microcontroller controlling data exchange between the control device and the path measuring device,
means for coupling the communication interface to the control signal communication channel and the propagation-time signal communication channel,
means responsive to the microcontroller for receiving signals from at least one of the control signal communication channel and the propagation-time signal communication channel,
means responsive to the microcontroller for transmitting digital data between the control device and the path measuring device via the interface, said digital data transmitted via the communication interface being one of: (a) combined with one of the control signal or the propagation time signal for transmission; and (b) transmitted separately from the control signals for the measurement of the propagation time and the propagation-time signals, wherein:
the path measuring device comprises a path transducer;
the measurement signal comprises a mechanical wave propagated in or on said transducer;
the communication interface is coupled between the path measuring device and the control device;
a starting flank of a control pulse of the control signal triggers a measurement signal for measuring of the propagation time through said path measuring device for use in making said distance measurement; and
a pulse duration of the control pulse triggering the measurement of the propagation time has an instruction effect for the path measuring device.

2. Communication interface as defined in claim 1, wherein the transmission of data is shifted in time in relation to at least one of the control signals and the propagation-time signals.

3. Communication interface as defined in claim 1, wherein the propagation-time signals comprise starting signals for triggering a measurement of the propagation time and stop signals, wherein the propagation time results from a time interval between starting signals and associated stop signals.

4. Communication interface as defined in claim 3, wherein a control signal triggers the starting signal for triggering the measurement of the propagation time.

5. Communication interface as defined in claim 3, wherein the transmission of the stop signals is blocked during the transmission of data.

6. Communication interface as defined in claim 1, wherein the digital data are transmittable serially between the control device and the path measuring device.

7. Communication interface as defined in claim 1, wherein the digital data are transmittable bit-serially between the control device and the path measuring device.

8. Communication interface as defined in claim 1, wherein an information unit for the transmission of the data between control device and path measuring device comprises N bits.

9. Communication interface as defined in claim 8, wherein the information unit begins with a starting bit.

10. Communication interface as defined in claim 1, wherein at least one of instructions and parameters are transmittable to the path measuring device.

11. Communication interface as defined in claim 10, wherein the transmission of the at least one of the instructions and parameters to the path measuring device takes place on the control signal communication channel.

12. Communication interface as defined in claim 10, wherein response data of the path measuring device to the at least one of the instructions and parameters received are transmittable to the control device.

13. Communication interface as defined in claim 12, wherein the transmission of the response data takes place on the propagation-time signal communication channel.

14. Communication interface as defined in claim 1, wherein at least one of event data and parameter data of the path measuring device are transmittable to the control device.

15. Communication interface as defined in claim 14, wherein the transmission of the at least one of the event data and parameter data takes place on the propagation-time signal communication channel.

16. Communication interface as defined in claim 14, wherein the path measuring device sends the at least one of the event data and parameters cyclically to the control device.

17. Communication interface as defined in claim 1, wherein the pulse duration of the control pulse triggering the measurement of the propagation time is adjustable.

18. Communication interface as defined in claim 1, wherein at least one of an instruction and parameter is transmitted to the path measuring device when a certain pulse duration threshold is exceeded.

19. Communication interface as defined in claim 18, wherein the transmission of the at least one of the instructions and parameters take place at a certain time interval in relation to the control pulse.

20. Communication interface as defined in claim 1, wherein the communication interface is coupled to the respective communication channels via multiplexers.

21. Communication interface as defined in claim 1, wherein the path transducer acts magnetostrictively.

22. Communication interface as defined in claim 1, wherein at least one of the communication channels is unidirectional.

23. Communication interface as defined in claim 1, wherein at least one of the communication channels is bidirectional.

24. Communication interface as defined in claim 1, wherein:
the control signal communication channel and the propagation time signal communication channel are separate unidirectional communication channels;
said control signal communication channel communicates in a first direction between said control device and said path measuring device; and
said propagation time signal communication channel communicates in a second direction between said path measuring device and said control device.

25. Path measuring system, comprising:
a control device;
one or more path measuring devices couplable to the control device, a distance measurement being carried out via a measurement of the propagation time of measurement signals within said path measuring device or devices,
a control signal communication channel for triggering a measurement of the propagation time,
a propagation-time signal communication channel for propagation-time signals, and
a communication interface coupled between the control device and the one or more path measuring devices to at least one of the control signal communication channel and the propagation-time signal communication channel, wherein:
at least one of said one or more path measuring devices comprises a path transducer having a waveguide in which mechanical waves propagate;
the measurement signals comprise mechanical waves propagated in or on said transducer;
the distance measurement is carried out via a measurement of the propagation time of the measurement signals within the waveguide;
digital data are transmittable between the control device and the path measuring device via the communication interface, said digital data transmittable via the communication interface being one of: (a) combined with one of the control signal or the propagation time signal for transmission; and (b) transmitted separately from the control signals for the measurement of the propagation time and the propagation-time signals;
a starting flank of a control pulse of the control signal triggers a measurement signal for measuring of the propagation time through said path measuring device for use in making said distance measurement; and
a pulse duration of the control pulse triggering the measurement of the propagation time has an instruction effect for the path measuring device.

26. Path measuring system as defined in claim 25, comprising a plurality of path measuring devices.

27. Path measuring system as defined in claim 25, wherein the control device is connected to the path measuring devices via a data bus.

28. Path measuring system as defined in claim 27, wherein a specific path measuring device is adapted to be addressed by the control device via an address identification.

29. Method for the control of a path measuring device comprising:
measuring the propagation time of measurement signals via a path measuring device to provide a distance measurement,
transmitting control signals from a control device for triggering a measurement of the propagation time via a control signal communication channel, and
transmitting propagation-time signals on a propagation-time signal communication channel, wherein:
at least one of said one or more path measuring devices comprises a path transducer having a waveguide in which mechanical waves propagate;
the measurement signals comprise mechanical waves propagated in or on said transducer;
the distance measurement is carried out via a measurement of the propagation time of the measurement signals within the waveguide;
digital data are transmitted between the control device and the path measuring device via a communication interface, said digital data transmittable via the communication interface being one of: (a) combined with one of the control signal or the propagation time signal for transmission; and (b) transmitted separately from the control signals and the propagation-time signals, the communication interface coupled between the control device and the path measuring device to at least one of the control signal communication channel and the propagation-time signal communication channel;
a starting flank of a control pulse of the control signal triggers a measurement signal for measuring of the propagation time through said path measuring device for use in making said distance measurement; and
a pulse duration of the control pulse triggering the measurement of the propagation time has an instruction effect for the path measuring device.

30. Method as defined in claim 29, wherein the transmission of data is shifted in time in relation to at least one of the control signals and the propagation-time signals.

31. Method as defined in claim 29, wherein the propagation-time signals comprise starting signals for triggering a measurement of the propagation time and stop signals, wherein the propagation time results from a time interval between starting signals and associated stop signals.

32. Method as defined in claim 31, wherein a control signal triggers the starting signal for triggering the measurement of the propagation time.

33. Method as defined in claim 31, wherein the transmission of the stop signals is blocked during the transmission of data.

34. Method as defined in claim 29, wherein the digital data are transmittable serially between the control device and the path measuring device.

35. Method as defined in claim 29, wherein the digital data are transmittable bit-serially between the control device and the path measuring device.

36. Method as defined in claim 29, wherein an information unit for the transmission of the data between control device and path measuring device comprises N bits.

37. Method as defined in claim 36, wherein the information unit begins with a starting bit.

38. Method as defined in claim 29, wherein at least one of instructions and parameters are transmittable to the path measuring device.

39. Method as defined in claim 38, wherein the transmission of the at least one of the instructions and parameters to the path measuring device takes place on the control signal communication channel.

40. Method as defined in claim 38, wherein response data of the path measuring device to the at least one of the instructions and parameters received are transmittable to the control device.

41. Method as defined in claim 40, wherein the transmission of the response data takes place on the propagation-time signal communication channel.

42. Method as defined in claim 29, wherein at least one of event data and parameter data of the path measuring device are transmittable to the control device.

43. Method as defined in claim 42, wherein the transmission of the at least one of the event data and parameter data takes place on the propagation-time signal communication channel.

44. Method as defined in claim 42, wherein the path measuring device sends the at least one of the event data and parameters cyclically to the control device.

45. Method as defined in claim 29, wherein the pulse duration of the control pulse triggering the measurement of the propagation time is adjustable.

46. Method as defined in claim 29, wherein at least one of an instruction and parameter is transmitted to the path measuring device when a certain pulse duration threshold is exceeded.

47. Method as defined in claim 46, wherein the transmission of the at least one of the instructions and parameters take place at a certain time interval in relation to the control pulse.

48. Method as defined in claim 29, wherein the communication interface is coupled to the respective communication channels via multiplexers.

49. Method as defined in claim 29, wherein the path transducer acts magnetostrictively.

50. Method as defined in claim 29, wherein at least one of the communication channels is unidirectional.

51. Method as defined in claim 29, wherein at least one of the communication channels is bidirectional.

* * * * *